United States Patent [19]

Guardiola

[11] Patent Number: 4,892,185
[45] Date of Patent: Jan. 9, 1990

[54] AUTOMATIC DISCHARGING TROUGH FOR USE IN A WEIGHING MACHINE

[75] Inventor: Agustín D. Guardiola, Barcelona, Spain

[73] Assignee: Talleres Daumar S.A., Barcelona, Spain

[21] Appl. No.: 156,286

[22] Filed: Feb. 16, 1988

[30] Foreign Application Priority Data

Feb. 27, 1987 [ES] Spain .................................. 8700939

[51] Int. Cl.[4] ........................................ B65G 47/34
[52] U.S. Cl. ............................. 198/477.1; 198/483.1; 198/704
[58] Field of Search .................... 198/477.1, 703, 704, 198/476.1, 483.1; 209/592, 698; 177/105, 109, 110, 114; 222/144, 168.5, 502, 504, 556

[56] References Cited

U.S. PATENT DOCUMENTS

| | | | |
|---|---|---|---|
| 1,122,482 | 12/1914 | Cummins | 177/109 |
| 1,319,105 | 10/1919 | Muirhead | 177/109 X |
| 2,595,689 | 5/1952 | Mitchell | 198/704 |
| 2,743,896 | 5/1956 | Nauta | 177/109 X |
| 3,185,230 | 5/1965 | Blough | 177/114 X |
| 3,296,954 | 1/1967 | Haub et al. | 198/704 X |
| 4,488,610 | 12/1984 | Yankloski | 209/698 X |
| 4,520,884 | 6/1985 | Mikami | 177/109 X |

Primary Examiner—Robert J. Spar
Assistant Examiner—D. Glenn Dayoan
Attorney, Agent, or Firm—Lackenbach, Siegel, Marzullo & Aronson

[57] ABSTRACT

A trough has side walls tiltable around a shaft, which is horizontal and disposed radially relative to a rotational axis for a plurality of troughs arranged in a circle. The shaft is supported as a cantilever. Linkage mechanisms connect the tiltable side walls to a vertically displaceable member. When the displaceable member moves upwardly, the side walls swing outwardly to discharge the contents of the trough. When the displaceable member moves to its lower position, the side walls come together to close off the bottom of the trough. When the trough is closed, the linkage mechanism is in an over-center locked condition, whereby the weight of produce in the trough resting on the side walls cannot displace the side walls to the open position.

14 Claims, 5 Drawing Sheets

AUTOMATIC DISCHARGING TROUGH FOR USE IN A WEIGHING MACHINE

BACKGROUND OF THE INVENTION

This invention relates to an automatic discharging trough of the type used in weighing food products, and more particularly to an automatic discharging trough that is used in association with a weighing machine. The subject trough in its construction as described hereinafter provides several advantages. Weighing machines are known in the Spanish marketplace, especially for food products, which comprise troughs having articulated walls in order to discharge the troughs contents at a precise moment. In many instances, these weighing machines operate with use of electronic computers, and the like. The walls of the troughs are movable, usually operated by pneumatic devices or other devices of greater or lesser complexity. These devices are in turn actuated by motive means which produce the necessary forces for causing the opening and closing of the movable walls.

An automatic weighing machine for food products developed by the same applicant in Spain as for the invention presented here, includes a plurality of troughs arranged circularly on a horizontal plane. The plurality of troughs are rotated in unison about a central vertical axis. It is very desirable and convenient to use rotation of the assembly and a plurality of said troughs for obtaining automatic selected discharge of the troughs, said discharge being controlled by a programmed processing unit provided in the weighing machine.

To this end, the automatic discharging trough of the present invention is suitable for use in a weighing machine which includes a plurality of such troughs arranged preferably in a circle on a horizontal plane. The plurality of troughs rotate together in relation to a central, vertical axis.

SUMMARY OF THE INVENTION

The automatic trough in accordance with the invention has at least one of its side walls which is tiltable around a first shaft, which shaft is essentially horizontal and disposed approximately radially relative to a rotational axis for a plurality of troughs arranged in a circle. The shaft about which the tiltable wall pivots is supported at one end as a cantilever. Linkage mechanisms connect between the tiltable side walls and a vertically displaceable member. When the displaceable member moves upwardly, the side walls swing outwardly to discharge the contents of the trough. When the displaceable member moves to its lower position, the side walls come together to close off the bottom of the trough for purposes of retaining or loading produce therein. When the displaceable member is in its lower position with the tiltable side walls closing the trough, the linkage mechanism is in an overcenter locked condition, whereby the weight of produce in the trough resting on the side walls cannot displace the side walls to the open position. The open position is only achieved by forces acting on the displaceable member to raise it.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
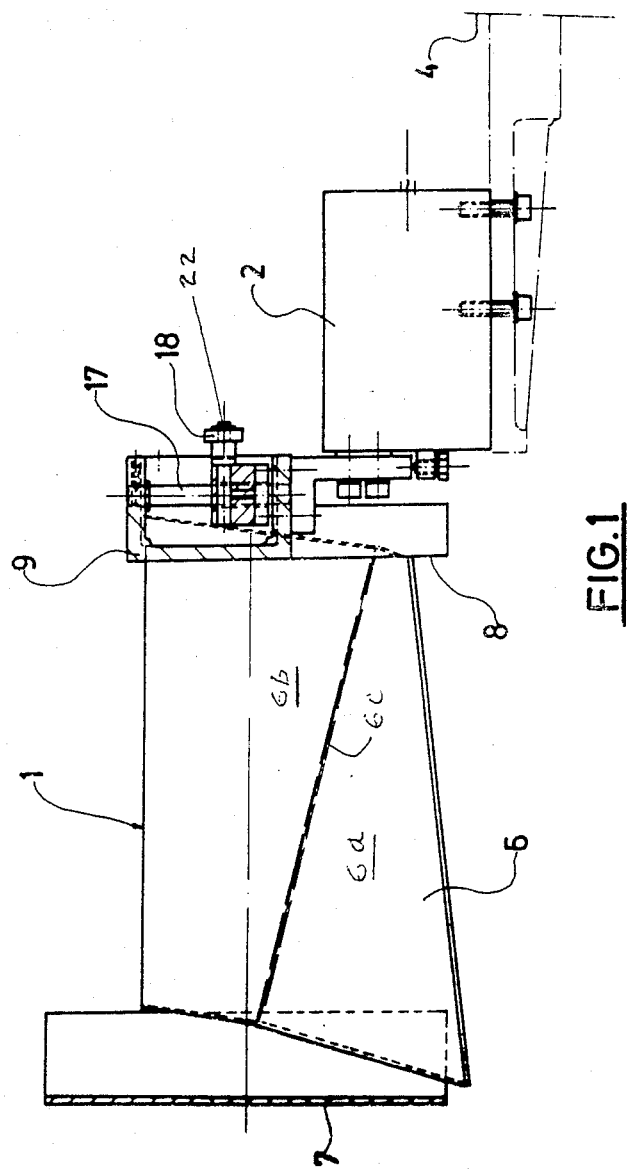
FIG. 1 is side elevational view of an automatic discharging trough in accordance with the invention with portions in section, and schematically illustrating the troughs mounting in a weighing machine.
Figure 2:
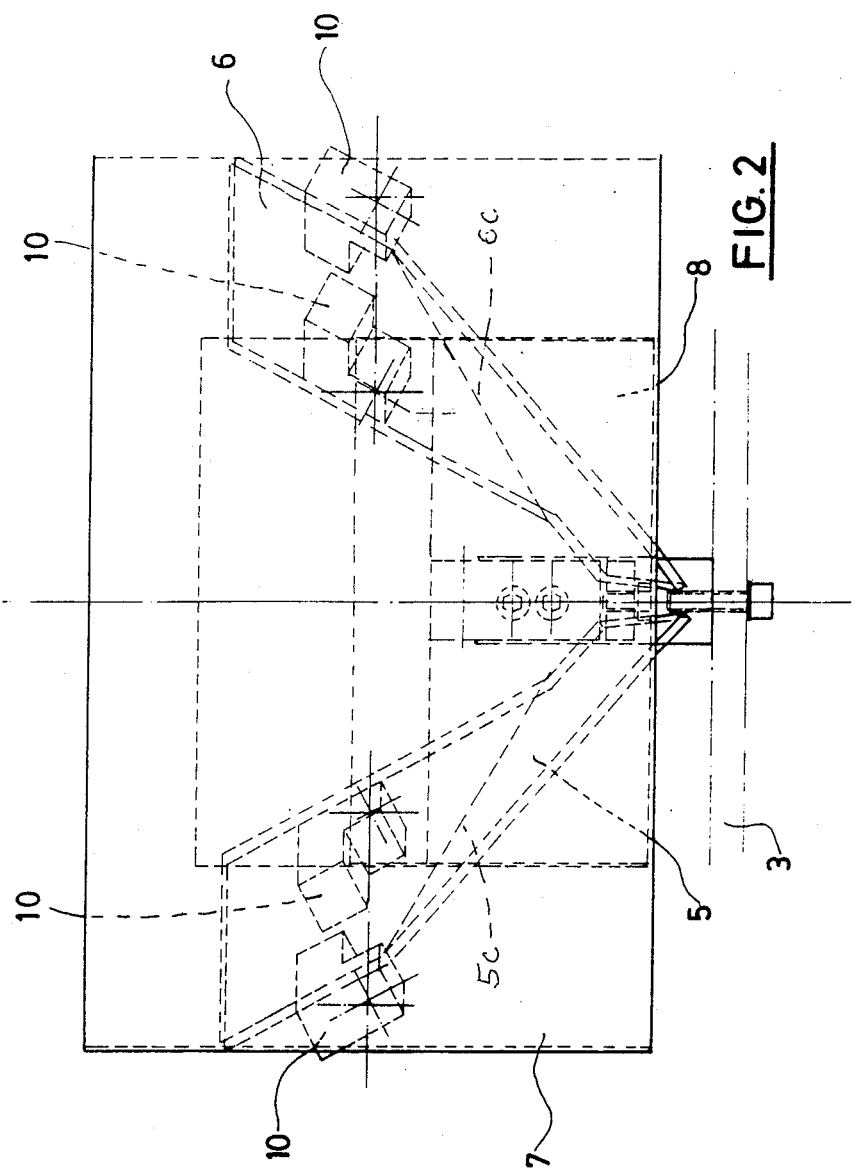
FIG. 2 is a front elevational view of the trough of FIG. 1, looking toward the axis of rotational.

With reference to the Figures, an automatic discharging trough 1 in accordance with the invention is fixed to a weighing means 2, which in turn is mounted over a platform 3. Combinations of troughs and weighing means, which troughs are the same as the trough 1, are arranged over the platform 3 in a circular pattern in a horizontal plane. The platform 3 and the troughs 1 rotate around a vertical, central axis 4 of the weighing machine.

Each trough 1 has at least one of its two side walls capable of tilting. In the illustrated embodiment, two side walls 5, 6 are tiltable. Each of the walls 5, 6 has a broken shape as illustrated in the drawings, where it can be seen that wall 5 is composed of a trapezoidally-shaped panel 5a connected to a trapezoidally-shaped panel 5b along a linear bend line 5c. Similarly, the side wall 6 is formed of trapezoidally-shaped panels 6a, 6b meeting along a bend line 6c. These planar segments meet at an obtuse angle to each other.

The trough 1 includes, in addition to the side walls 5, 6, an external wall 7 and an internal wall 8 which is closest to the rotational axis 4. The internal wall 8 is connected in this embodiment, to a piece 9 having a C shape when viewed in vertical section (FIG. 1). In the plan view (FIG. 3), the piece 9 in section has a somewhat V shape with two sides extending from an apex 9a at a very open, that is, obtuse angle. The sides of the piece 9 are respectively parallel to surfaces of the trough's external wall 7.

Figure 3:
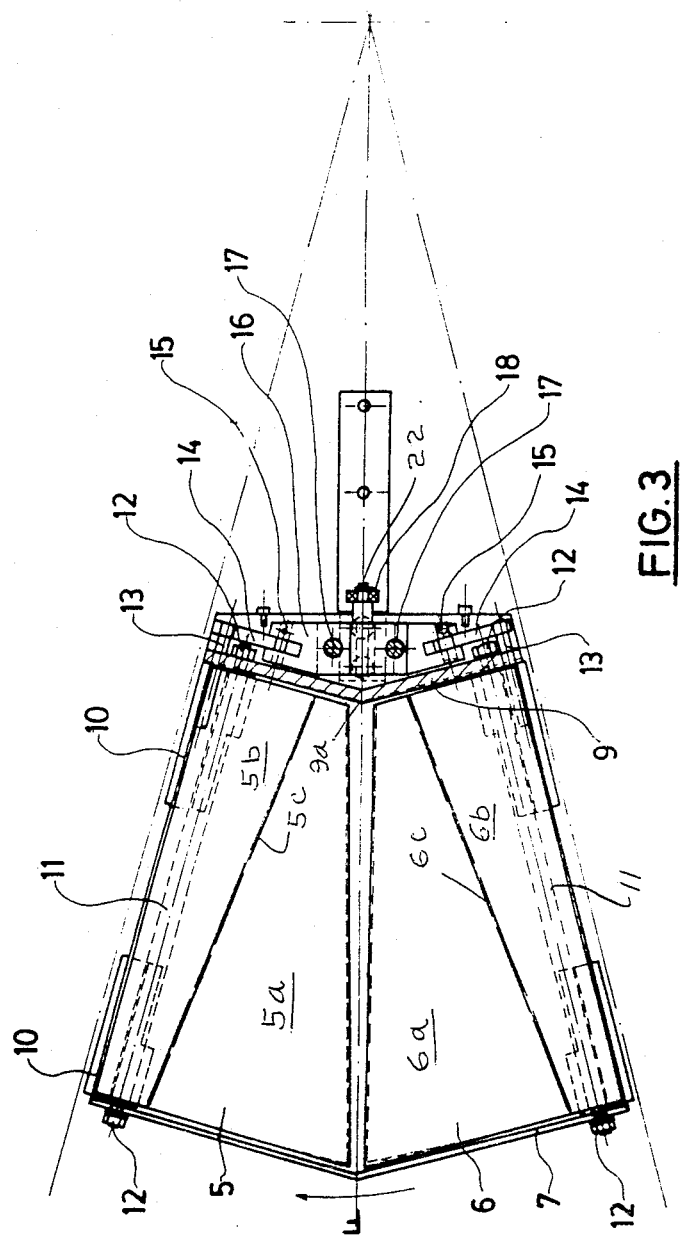
FIG. 3 is a top plan view of the trough of FIG. 1.

Rotation of a plurality of troughs 1, as previously described, takes place in the direction of the arrow F shown in FIG. 3. Nevertheless, in an alternative embodiment in accordance with the invention, the plurality of troughs 1 may be positioned and moved linearly or may move along a trajectory composed of straight portion and curved portions. However, a circular trajectory for the troughs 1 seems the most convenient, particularly because of the minimum space required for a given number of troughs and because of the relative simplicity of a rotating platform from a mechanical viewpoint.

Each side tilting wall 5, 6 has connected at its outside surface, two blocks 10, which are spaced apart in what would be considered a radial direction relative to rotation about the axis 4. These pairs of blocks 10 each serve to align a shaft 11 which passes through a pair of blocks. Each shaft 11 is fixed at its ends by means of nuts 12, to the outer wall 7 of the trough at one end of the shaft 11 and at the other end of the shaft 11 to the vertical wall presented by the sides of the piece 9. The shafts 11 are positioned approximately radially in relation to the vertical rotational axis 4 of the assembly. In the illustrated embodiment, the shafts 11 are parallel to a true radius of rotation.

Thus, as described more fully hereinafter, the side walls 5, 6 can pivot about the shafts 11 which are fixedly positioned between the front wall 7 and the sides of the piece 9. Because the wall 7 is suspended on the shafts 11, and the shafts 11 have no other support at the wall 7, the shafts 11 are supported only at one end where they are bolted by the nuts 12 to the piece 9. That is, the shafts 11 overhang as cantilevers from the central structure. The attachments to the weighing means 2 and supports therefor must be of sufficient mechanical strength and reinforcement to withstand forces exerted by troughs 1 which are suspended in this cantilever fashion.

Figure 4:
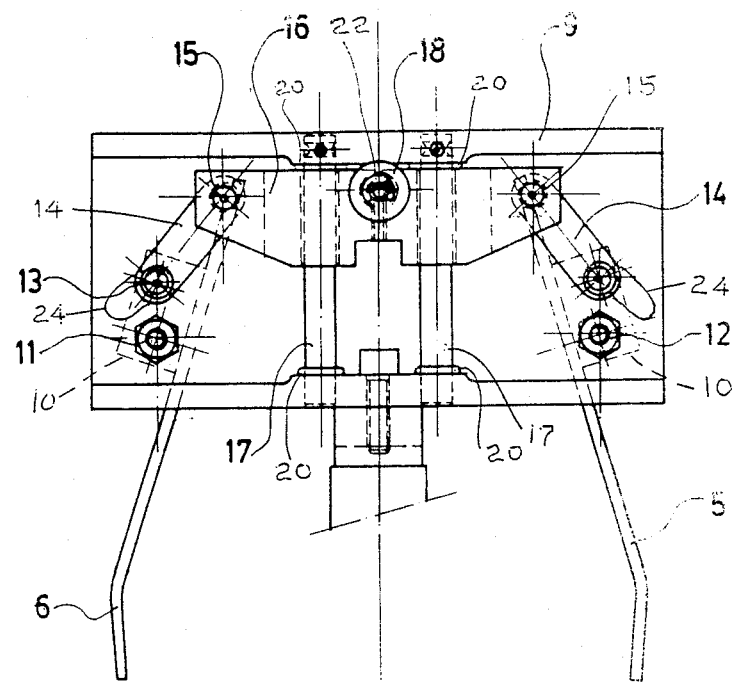
FIG. 4 is an elevational view, looking from the axis of rotation, of the mechanism for driving the tiltable side walls of the trough, the side walls being in an opened position suitable for discharging the trough's contents.

Another shaft 3 is mounted as a cantilever in each block 10 which is closest to the rotational axis 4 and extends from the block 10 toward the axis 4. As best illustrated in FIG. 4, the shafts 13 are located at a greater height than the height of the associated shaft 11. The cantilevered shaft 13 extends into the hollow of the V of the piece 9, passing through an opening 24 in the vertical portion of the C-shaped cross-section of the piece 9.

Each cantilevered shaft 13 is hinged to the end of a respective link 14 which in turn is pivotably connected to a shaft 15 which is mounted on a vertically displaceable piece 16. The displaceable piece 16 is slidable along a pair of vertical rods 17 which serve to guide the piece 16. The two rods 17 are fixed at their ends between the two horizontal branches of the C shape of the piece 9 (FIG. 1). As best illustrated in FIG. 3, the displaceable piece 16 has through-openings through which the rods 17 pass.

In an alternative embodiment, in accordance with the invention, a single vertical guide rod 17 may be used, and in other embodiments, more than two rods may be used, as suits the mechanical construction.

Figure 5:
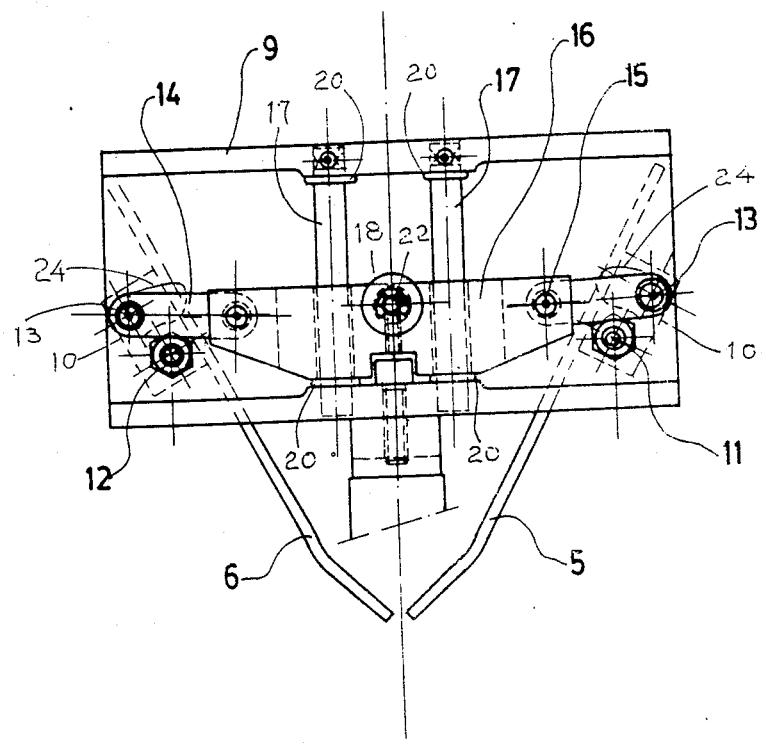
FIG. 5 is a view similar to FIG. 4 with the side walls in the closed position suitable for containing products within the trough.

It can be seen in FIGS. 4 and 5, that a "four-link" mechanism is formed with pivots at the shafts 11, 13 and 15, plus the sliding joint of the piece 16 on the rods 17. Whereas, in the illustrated embodiment, the shaft 13 is always physically higher than the shaft 11, in an alternative embodiment in accordance with the invention, the shafts 11 and 13 can be arranged in a substantially horizontal position, and there are other physical arrangements which are convenient.

At the ends of the vertical rods 17, shock absorbers 20 are positioned so that at the upper and lower ends of travel of the displaceable piece 16, contact is made with the shock absorbers, which are resilient donut-shaped rings, for the suppression of noises which otherwise would be produced by virtue of the shock of the displaceable piece 16 striking against the upper and lower horizontal branches of the C-shaped piece 9. Means (not shown) may be used to reduce friction between the displaceable piece 16 and the guide rods 17.

Arcuate openings 24 are provided in the vertical portion of the C-shaped piece 9, such that rotational movement of the cantilevered shaft 13 about the shaft 11 is possible. As stated above, the shafts 13 extend from the inner blocks 10 through the surface of the piece 9.

The vertically displaceable piece 16 has in its rear portion, that is, more proximate to the rotational axis 4, a rotatable wheel 18 which is mounted on a radially and horizontally oriented shaft 22. This wheel 18 is operated upon selectively by the weighing machine through engaging devices, in order to raise or lower the wheel 18 and the connected displaceable piece 16. Thereby, the side tilting walls 5, 6 are moved to an open position (FIG. 4) when the wheel 18 is raised causing the attached movable piece 16 to be at the top of its travel. When the wheel 18 is moved to its lower position (FIG. 5), causing the attached movable displaceable piece 16 to lower, the tilting side walls 5, 6 are in the closed position.

In comparing the open position of FIG. 4 with the closed position of the walls 5, 6 in FIG. 5, it should be noted that the positions of the cantilevered shafts 11 are unchanged when the displaceable piece 16 moves from its uppermost to its lowermost position. The shafts 15, which are connected to the displaceable piece 16, move up and down in a linear vertical trajectory. However, the shafts 13 swing outwardly in arcs pivoting around the shafts 11 as the piece 16 descends. Thus, it is necessary that the openings 24 in the V-shaped surfaces of the piece 9 through which the shafts 13 extend from the blocks 10, allow clearance for the motion of the shaft 13.

When the displaceable piece 16 moves by action upon the rotating wheel 18, as previously described, to its upper position (FIG. 4), the two side walls 5, 6 are rotated in relation to the shafts 11 so that the side walls are separated one from the other corresponding to an open trough position for discharging of the product previously contained in the trough 1. When the displaceable piece 16 is forced to descend by an action on the wheel 18, the piece 16 arrives at its lowest position (FIG. 5), and a closed trough position is achieved in order to contain or receive the product which is to be stored. In this lower position, the geometric center of the cantilever shaft 13 is situated, as illustrated, as being slightly higher in relation to the geometric center of the shaft 15, such that the link 14 is in an overcenter position relative to the displaceable piece 16. This provides a locking effect in the closed position of the trough 1 which favors and secures this position. The walls 5, 6 of the trough 1 cannot open inadvertently due to the weight of the product which is stored in it. The side walls 5, 6 cannot open until a force is applied to the wheel 18 which raises the movable piece 16 and places the link 14 at an angle which slopes upwardly from shaft 13 to shaft 15. With this upward slope of the link 14, the weight of product in the trough aids in further rapid opening of the side walls 5, 6.

On the internal faces of the side tilting walls 5, 6 of the troughs 1 may be positioned strips, pads or the like (not shown), in order to attenuate noises during the discharge of products which may be contained in the troughs. Likewise, the wheel 18 in alternate embodiments in accordance with the invention, may be replaced by other members suitable for application of forces to raise and lower the piece 16, for example, some type of cam.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An automatic discharging trough for a weighing machine comprising:
   a support piece including a C-shaped vertical section having upper and lower horizontal branches,
   at least one substantially vertical rod fixed between the upper and lower horizontal branches of the C-shaped section,
   a substantially vertical displaceable piece slidable along said at least one substantially vertical rod, said rod serving as a guide for said piece,
   a first tilting side wall,
   a first link hinged at one end thereof to said vertically displaceable piece, and attached at the other end thereof to said first tilting side wall,
   a second tilting side wall, and
   a second link hinged at one end thereof to said vertically displaceable piece, and attached at the other end thereof to said second tilting side wall,
   end walls having fixed positions relative to said support piece, said side walls and said end walls in combination comprising at least a portion of the storage volume of said trough when said trough is closed,
   substantially vertical movement of said substantially vertically displaceable piece in one direction along said at least one substantially vertical rod causes said side walls to move for closing said trough, and
   substantially vertical movement of said substantially vertically displaceable piece in the opposite direction along said at least one substantially vertical rod causes said sidewalls to move apart for opening said trough, side displaceable piece being subject to movement by application of an external force.

2. The automatic discharge trough of claim 1, and further comprising means connected to said substantially vertically displaceable piece to receive said external force for elevating or lowering said displaceable piece.

3. The automatic discharge trough of claim 2, wherein said means comprises a wheel connected to said displaceable piece.

4. A trough for holding product as claimed in claim 1 and further comprising a pair of first shafts, each shaft connected at one end to said support piece and each pivotably supporting one said side wall.

5. A trough for holding product as claimed in claim 1, wherein said links are in an over-center locked condition when said trough is closed.

6. A trough for holding product, said trough being suited for use with a weighing machine, comprising:
   a support piece;
   at least one shaft connected at one end to said support piece and extending therefrom;
   at least one side wall for said trough, said at least one side wall being pivotally connected to said at least one shaft and movable between a first open position and a second closed position;
   additional walls fixed in position relative to said support piece, said at least one side wall in combination with said additional fixed walls, comprising at least a portion of the storage volume of said trough when said at least one side wall is in said second closed position;
   a displaceable piece subject to displacement between a first position and a second position;
   force transmitting means connected to said displaceable piece and adapted for receiving an external force and transmitting said force to said displaceable piece and causing displacement thereof;
   at least one linkage mechanism connecting between said displaceable piece and said at least one pivotable side wall, said at least one linkage mechanism having a first link with first and second ends, said at least one side wall being connected to said first end of said first link, an intermediate link pivotably connected at both ends and extending between said second end of said first link and said displaceable piece, which first link pivots at one end about said at least one shaft,
   said at least one side wall moving to said second closed position, when an external force transmitted to said displaceable piece causes said displaceable piece to move to its second position, movement of said displaceable piece causing actuation of said linkage mechanism, said linkage mechanism, said linkage mechanism pivoting said at least one side wall.

7. A trough for holding product as claimed in claim 6, wherein at least one linkage mechanism goes into an overcenter locked condition when said at least one side wall is in the second closed position, only forces applied to move said displaceable piece toward its first position being capable of moving said at least one side wall to an open first position, forces applied directly to said at least one side wall being incapable of moving said at least one side wall from said second closed position to said first open position.

8. A trough for holding product as claimed in claim 6, wherein the number of said at least one shaft, said at least one side wall and said at least one linkage mechanism is two, each said side wall being pivotably connected to one said corresponding shaft, each said linkage mechanism connecting one said side wall with said displaceable piece moving linearly and substantially vertically,
   whereby movement of said displaceable piece to a lower position being transmitted through said each linkage mechanism to said each corresponding side wall results in said second closed position of said side walls and movement of said displaceable piece to an upper position being transmitted through said each linkage mechanism to said corresponding side wall results in said first open position of said side walls.

9. A trough for holding product as claimed in claim 8, wherein said linkage mechanisms goes into an over-center locked condition when said side walls are in the second closed position, only forces applied to move said displaceable piece toward its first position being capable of moving said side walls to an open first position, forces applied directly to said side walls being incapable of moving said side walls from said second closed position to said first open position.

10. A trough for holding product as claimed in claim 6 wherein said linkage mechanism goes into an over-center locked condition when said at least one side wall is in the second closed position, only forces applied to move said displaceable piece toward its first position being capable of moving said at least one side wall to an open first position, forces applied directly to said at least one side wall being incapable of moving said at least one side wall from said second closed position to said first open position.

11. A trough for holding product as claimed in claim 6, and further comprising a plurality of said troughs mounted circularly in a plane for rotation about a common axis.

12. A trough for holding product as claimed in claim 6, and further comprising a rod, said displaceable piece being guided on said rod for said linear motion between said first position and said second position of said displaceable piece, said rod being connected to said support piece.

13. A trough for holding product as claimed in claim 6, wherein said at least one shaft is connected at said one end as a cantilevered member.

14. A trough for holding product as claimed in claim 8, wherein said two shafts lie in a common plane and diverge from each other, the distance between said shafts being least at said connections to said support piece.

* * * * *